(12) United States Patent
Lee et al.

(10) Patent No.: US 10,474,344 B2
(45) Date of Patent: Nov. 12, 2019

(54) METHOD, APPARATUS AND RECORDING MEDIUM FOR A SCROLLING SCREEN

(71) Applicant: Samsung Electronics Co., Ltd., Gyeonggi-do (KR)

(72) Inventors: Ho-Young Lee, Seoul (KR); Chul-Ho Jang, Seoul (KR); Min-Kyung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 14/465,817

(22) Filed: Aug. 21, 2014

(65) Prior Publication Data

US 2015/0058793 A1    Feb. 26, 2015

(30) Foreign Application Priority Data

Aug. 21, 2013 (KR) .................. 10-2013-0099021

(51) Int. Cl.
*G06F 3/0485* (2013.01)
*G06F 3/0481* (2013.01)
*G06F 3/0483* (2013.01)
*G06F 3/0488* (2013.01)

(52) U.S. Cl.
CPC ........ *G06F 3/04855* (2013.01); *G06F 3/0483* (2013.01); *G06F 3/0485* (2013.01); *G06F 3/04817* (2013.01); *G06F 3/04883* (2013.01)

(58) Field of Classification Search
CPC .... G06F 3/0488; G06F 3/0483; G06F 3/0485; G06F 3/04855; G06F 3/04817; G06F 3/04883; G06F 3/04847; G06F 3/017; G06F 3/0482

USPC .......................................................... 715/784
See application file for complete search history.

(56) References Cited

U.S. PATENT DOCUMENTS

| | | | | |
|---|---|---|---|---|
| 5,870,098 A | * | 2/1999 | Gardiner | G06T 17/05 345/426 |
| 6,642,945 B1 | * | 11/2003 | Sharpe | G06F 17/30905 345/156 |
| 7,439,975 B2 | * | 10/2008 | Hsu | G06T 15/60 345/426 |
| 7,675,518 B1 | * | 3/2010 | Miller | G06T 15/06 345/426 |
| 8,863,039 B2 | * | 10/2014 | Lim | G06F 3/04883 715/788 |
| 9,128,555 B2 | * | 9/2015 | Lee | G06F 1/1643 |

(Continued)

FOREIGN PATENT DOCUMENTS

KR   10-2013-0058181    6/2013

*Primary Examiner* — Matthew Ell
*Assistant Examiner* — Maria S Ayad

(57) ABSTRACT

A method for scrolling a screen on a display, the method comprising determining whether a screen is located at a scroll boundary when receiving a scrolling gesture, and adding at least one boundary effect to at least one object contained on the screen when the screen is located at the scroll boundary. An apparatus for scrolling a screen, the apparatus comprising a touch display to display the screen and receive a scrolling gesture, and a controller configured to determine whether a screen on the touch screen is located at a scroll boundary when a scrolling gesture is detected, and if the screen on the touch screen is located at the scroll boundary, add at least one boundary effect to at least one object contained on the screen.

14 Claims, 13 Drawing Sheets

Normal

(56) References Cited

U.S. PATENT DOCUMENTS

| | | | |
|---|---|---|---|
| 9,324,183 B2* | 4/2016 | King | G06T 15/60 |
| 9,329,764 B2* | 5/2016 | Kuscher | G06F 3/0485 |
| 2007/0236475 A1* | 10/2007 | Wherry | G06F 3/0485 |
| | | | 345/173 |
| 2007/0261001 A1* | 11/2007 | Nagiyama | G06F 3/0482 |
| | | | 715/810 |
| 2009/0087025 A1 | 4/2009 | Ma | |
| 2009/0094557 A1* | 4/2009 | Howard | G06F 17/30241 |
| | | | 715/848 |
| 2010/0321411 A1* | 12/2010 | Paek | G06F 3/04883 |
| | | | 345/684 |
| 2011/0090255 A1* | 4/2011 | Wilson | G06F 3/04817 |
| | | | 345/647 |
| 2012/0133677 A1* | 5/2012 | Suzuki | G06F 1/1694 |
| | | | 345/649 |
| 2012/0188243 A1* | 7/2012 | Fujii | G06T 19/20 |
| | | | 345/426 |
| 2012/0272181 A1* | 10/2012 | Rogers | G06F 3/0482 |
| | | | 715/784 |
| 2014/0152599 A1* | 6/2014 | Lee | G06F 3/017 |
| | | | 345/173 |

* cited by examiner

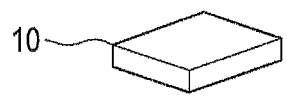 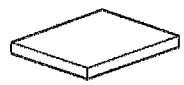 
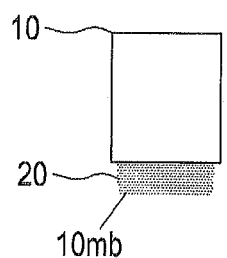 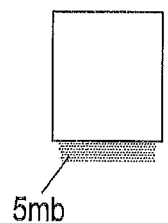 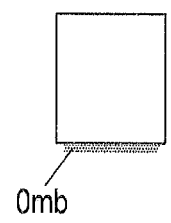
FIG.7A   FIG.7B   FIG.7C
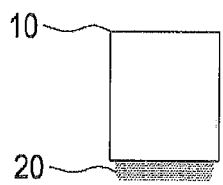  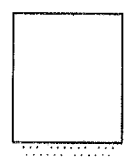
FIG.8A   FIG.8B   FIG.8C
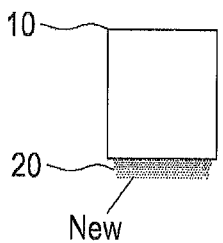 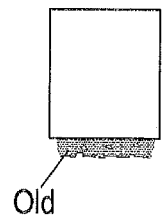
FIG.9A   FIG.9B

METHOD, APPARATUS AND RECORDING MEDIUM FOR A SCROLLING SCREEN

CROSS-REFERENCE TO RELATED APPLICATION(S) AND CLAIM OF PRIORITY

The present application is related to and claims priority under 35 U.S.C. § 119(a) to Korean Patent Application Serial No. 10-2013-0099021, which was filed in the Korean Intellectual Property Office on Aug. 21, 2013, the entire disclosure of which is incorporated herein by reference.

TECHNICAL FIELD

The present disclosure relates to a method, an apparatus and a recording medium for displaying a screen in scrolling the screen, which provide a display environment capable of visualizing information and displaying the visualized information.

BACKGROUND

Various applications and multiple pieces of data, such as various data or contents which have been newly entered or downloaded, can be stored in a recent electronic device. Accordingly, the electronic device configures the multiple pieces of data in the form of a list, and provides a screen on which the multiple pieces of data configured in the form of a list are sequentially displayed in any one or any combination of forms, such as multiple rows of text, multiple rows of bars, multiple rows of boxes, and multiple rows of icons. Also, typically, the electronic device provides an interface scheme for moving a screen (i.e., moving a displayed item) through an operation of scrolling the screen.

A screen display technology has been developed which can provide a more intuitive and emotional screen to a user when the user searches various data lists through a scrolling operation in the electronic device.

SUMMARY

A method for scrolling a screen on a display, the method comprising determining whether a screen is located at a scroll boundary when receiving a scrolling gesture, and adding at least one boundary effect to at least one object contained on the screen when the screen is located at the scroll boundary.

In certain embodiments, the boundary effect comprises at least one of a first image effect and a second image effect.

In certain embodiments, the first effect image is a light effect whose direction corresponds to a progress of the scrolling gesture.

In certain embodiments, the second effect is a shadow image effect which is added on a contour(s) of at least one object.

In certain embodiments, the method further comprises identifying a current time zone among preset time zones, wherein the shadow effect has a different length for each preset time zone.

In certain embodiments, the method further comprises detecting the metadata information of the at least one object displayed on the screen, wherein the shadow effect is determined based on the metadata information.

In certain embodiments, the metadata information includes a capacity of the object, and the shadow effect which is set according to the metadata information has a length which is set differently for each size of the capacity of the object.

In certain embodiments, the metadata information comprises at least one attribute information of a quality of material of the object, a transparency of the object, and a thickness of the object, and the shadow effect has at least one attribute of a transparency and a color, the at least one attribute being set differently according to the metadata information.

In certain embodiments, the metadata information comprises at least one information of a frequency of use of the object, and a generation date of the object, and the shadow effect is set differently depending on each of the at least one information according to the metadata information.

In certain embodiments, the method comprises identifying an area where the shadow effect is to be displayed in the contour part of the object, determining whether hidden information exists in the identified area where the shadow effect is to be displayed, and displaying the hidden information so as to overlap the shadow effect, when the hidden information exists in the identified area where the shadow effect is to be displayed.

In certain embodiments, the method comprises determining whether hidden information exists in the object when the screen is located at the scroll boundary, and displaying the hidden information so as to overlap a shadow of the shadow effect when the hidden information exists in the object.

In certain embodiments, the method further comprises adding the second image effect to an opposite end side of the scroll boundary on the screen when the screen is located at the scroll boundary.

In certain embodiments, the object comprises at least one of an icon, a widget, a text, a picture, a photograph and an electronic book.

An apparatus for scrolling a screen, the apparatus comprising a touch display to display the screen and receive a scrolling gesture, and a controller configured to determine whether a screen on the touch screen is located at a scroll boundary when a scrolling gesture is detected, and if the screen on the touch screen is located at the scroll boundary, add at least one boundary effect to at least one object contained on the screen.

A recording medium storing a program for operating an apparatus for displaying a screen in scrolling the screen, the apparatus comprising a touch screen to display the screen and receive a scrolling gesture, and a controller configured to determine whether a screen on the touch screen is located at a scroll boundary when a scrolling gesture is detected, and if the current screen on the touch screen is located at the scroll boundary, display a boundary effect on the scroll boundary of at least one object displayed on the screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A to 7C illustrate examples of applying shadow effects to objects on a screen, depending on metadata information of the objects on the screen when the screen is scrolled according to embodiments of the present disclosure;

FIGS. 8A to 8C illustrate another examples of applying shadow effects to objects on a screen, depending on metadata information of the objects on the screen when the screen is scrolled according to embodiments of the present disclosure;

FIGS. 9A to 9B illustrate examples of applying shadow effects to objects on a screen, depending on metadata information of the objects on the screen when the screen is scrolled according to an embodiment of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, exemplary embodiments of the present disclosure will be described in detail with reference to the accompanying drawings. The following description includes specific details such as a scroll boundary, a shadow effect, a light effect, etc., and the specific details are only provided in order to help a more comprehensive understanding of the present disclosure. Therefore, it will be apparent to those skilled in the art that predetermined changes and modifications may be made in the specific details without departing from the scope of the present disclosure.

Figure 1:
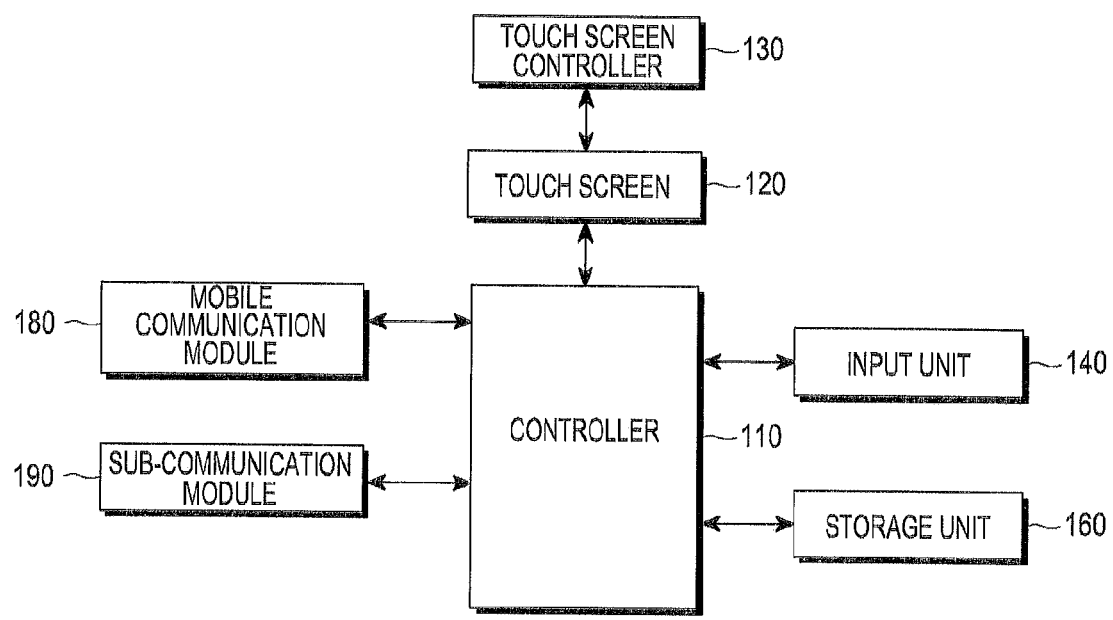
FIG. 1 is a block diagram illustrating a configuration of an electronic device which displays a screen in scrolling the screen, according to embodiments of the present disclosure.

FIG. 1 is a block diagram illustrating a configuration of an electronic device which displays a screen in scrolling the screen, according to embodiments of the present disclosure. Referring to FIG. 1, the electronic device 100 includes a display unit 120, a display controller 130, a input unit 140, a storage unit 160, and a controller 110. Also, the electronic device 100 can include a mobile communication module 180 and a sub-communication module 190. Hereinafter, a case will be described as an example in which the display unit 120 and the display controller 130 are a touch screen and a touch screen controller, respectively.

The touch screen 120 receives an input corresponding to the manipulation of the electronic device 100 by a user, and displays an execution image, an operation state and a menu state of an application program. Specifically, the touch screen 120 provides the user with a user interface matched to various services (e.g., telephone call, data transmission, broadcasting, and photography). The touch screen 120 transmits an analog signal matched to at least one touch, which is input to the user interface, to the touch screen controller 130. The touch screen 120 receives at least one touch as input from the user's body part (e.g., fingers, thumbs, etc.) or an input means (e.g., a stylus pen) enabling a touch, such as an electronic pen. Also, the touch screen 120 receives, as input, a continuous movement of one touch with respect to at least one touch. The touch screen 120 transmits an analog signal matched to a continuous movement of an input touch to the touch screen controller 130.

Also, according to an embodiment of the present disclosure, a touch is not limited to a direct contact between the touch screen 120 and the user's body part or the input means enabling a touch, but can include a non-contact.

In the touch screen 120, a detectable distance can change depending on the performance or structure of the electronic device 100. Also, in order to enable the detection of both a touch event due to the contact between the touch screen 120 and the user's body part or the input means enabling a touch and an event of input in a non-contact state (e.g., hovering) in such a manner as to distinguish the touch event from the hovering event, the touch screen 120 can be configured in such a manner that the touch screen 190 outputs different values (e.g., current values, etc.) detected during the touch event and detected during the hovering event. Further, when the touch screen 120 recognizes a hovering event, the touch screen 120 outputs different detected values (e.g., current values, etc.) according to a distance between space, in which the hovering event occurs, and the touch screen 120.

The touch screen 120, for example, can be implemented as a resistive touch screen, a capacitive touch screen, an infrared touch screen, a surface acoustic wave touch screen, and/or the like.

Meanwhile, the touch screen controller 130 converts an analog signal received from the touch screen 120 into a digital signal (e.g., X and Y coordinates), and provides the digital signal to the controller 110. The controller 110 controls the touch screen 120 by using the digital signal received from the touch screen controller 130. For example, in response to a touch event or a hovering event, the controller 110 causes a shortcut icon (not illustrated) displayed on the touch screen 120 to be selected, or causes the shortcut icon (not illustrated) to be executed. According to an embodiment of the present disclosure, the touch screen controller 130 can be included in the controller 110.

The touch screen controller 130 detects a value (e.g., a current value, etc.) which is output from the touch screen 120, and identifies a distance between a space, in which the hovering event occurs, and the touch screen 120. Then, the touch screen controller 130 converts the value of the identified distance into a digital signal (e.g., a Z coordinate), and provides the digital signal to the controller 110.

Also, in order to enable the touch screen 120 to simultaneously receive input from the user's body part and input from the input means enabling a touch, the touch screen 120 can include at least two touch screen panels which can sense the touch or proximity of the user's body part and the input means enabling a touch, respectively. The at least two touch screen panels provide different output values to the touch screen controller 130, and the touch screen controller 130 recognizes the values received from the at least two touch screen panels as different values. Accordingly, the touch screen controller 130 can determine whether an input received from the touch screen 120 is an input by the user's body part, or whether the input received from the touch screen 120 is an input by the input means enabling a touch.

The input unit 140 receives an input corresponding to the manipulation of the electronic device 100 by the user, and can include at least one of buttons (not illustrated) and a keypad (not illustrated).

The buttons (not illustrated) can be disposed on a front surface, a lateral surface or a rear surface of a housing of the electronic device 100, and can include at least one of a power/lock button, a volume button, a menu button, a home button, a back button and a search button.

The keypad (not illustrated) receives a key input from the user in order to control the electronic device 100. The keypad (not illustrated) includes a physical keypad mounted on the electronic device 100 and/or a virtual keypad displayed on the touch screen 120. According to an embodiment of the present disclosure, the physical keypad mounted on the electronic device 100 can be omitted.

According to the control of the controller 110, the mobile communication module 180 allows the electronic device 100 to be connected to an external device through mobile communication by using at least one antenna or multiple antennas (not illustrated). The mobile communication module 180 transmits and receives wireless signals for voice calls, video calls, Short Message Service (SMS) messages, Multimedia Messaging Service (MMS) messages, and the like to/from a mobile phone (not illustrated), a smart phone (not illustrated), a tablet Personal Computer (PC) or another device (not illustrated), which has a telephone number input to the electronic device 100. According to the control of the controller 110, the mobile communication module 180 can be connected to a wireless Internet and the like or can transmit and receive wireless signals to/from neighboring devices, at a place, where a wireless Access Point (AP) is installed, through Wi-Fi and a 3G/4G data network.

The sub-communication module 190 can include at least one of a wireless Local Area Network (LAN) module (not illustrated) and a short-range communication module (not illustrated).

According to the control of the controller 110, the wireless LAN module (not illustrated) can be connected to the Internet at a place where a wireless AP (not illustrated) is installed. The wireless LAN module (not illustrated) supports a wireless LAN standard (e.g., IEEE 802.11x of the Institute of Electrical and Electronics Engineers (IEEE)). According to the control of the controller 110, the short-range communication module (not illustrated) enables the electronic devices 100 to perform short-range wireless communication therebetween.

According to various embodiments of the present disclosure, the electronic device 100 can include at least one of the mobile communication module 180, the wireless LAN module (not illustrated) and the short-range communication module (not illustrated). For example, according to the performance of the electronic device 100, the electronic device 100 can include any combination of the mobile communication module 180, the wireless LAN module (not illustrated) and the short-range communication module (not illustrated).

According to the control of the control unit 110, the storage unit 150 stores signals or data which are input or output in response to operations of the touch screen 120, the input unit 140, the mobile communication module 180, and the sub-communication module 190. The storage unit 150 stores a control program for controlling the electronic device 100 or a control program for the controller 110, and applications.

The term "storage unit" can refer to any one of or a combination of the storage unit 160, a Read Only Memory (ROM) (not illustrated) and a Random Access Memory (RAM) (not illustrated) within the controller 110, and a memory card (not illustrated), such as a Secure Digital (SD) card or a memory stick, which is mounted on the electronic device 100. The storage unit can include a non-volatile memory, a volatile memory, a Hard Disk Drive (HDD), a Solid State Drive (SSD), and the like.

The controller 110 can include a Central Processing Unit (CPU) (not illustrated), a ROM (not illustrated) which stores a control program for controlling the electronic device 100, and a RAM (not illustrated) which stores a signal or data received from the outside of the electronic device 100 or is used as a memory area for a task performed by the electronic device 100. The CPU (not illustrated) can include multiple processors. For example, the CPU (not illustrated) can include a single-core processor, a dual-core processor, a triple-core processor, a quad-core processor, and the like. The CPU (not illustrated), the ROM (not illustrated) and the RAM (not illustrated) can be interconnected by an internal bus.

The controller 110 controls the touch screen 120, the touch screen controller 130, the input unit 140, and the storage unit 160.

Also, based on control characteristics of an operation of displaying a screen in scrolling the screen according to an embodiment of the present disclosure, the controller 110 determines whether the current screen on the touch screen is located at a scroll boundary when the controller 110 recognizes a scrolling gesture. When the controller 110 determines that the current screen on the touch screen is located at the scroll boundary, the controller 110 can perform a control operation for displaying a first effect image on at least one part of the scroll boundary, or can perform a control operation for displaying a second effect image for at least one object displayed on the current screen. In contrast, when the controller 110 determines that the current screen on the touch screen is not located at the scroll boundary when the controller 110 recognizes the scrolling gesture, the controller 110 performs a control operation for scrolling the current screen.

The screen, for example, sequentially displays items related to a relevant operation during the performance of various functions, such as a web search function, an electronic book function, a text conversation service function, a mail list search function, an SMS message reception/transmission item search function, an address book search function and a contact search function, according to preset criteria by using an object (e.g., an icon, a widget, text, a picture, a photograph, an electronic book, etc.) in the form of multiple rows of text, multiple rows of bars, multiple rows of boxes or multiple rows of icons, and by using any combination of forms, such as multiple rows of text, multiple rows of bars, multiple rows of boxes and multiple rows of icons. Due to the limited size of the display screen of the electronic device, the screen displays only some items selected from among all items according to preset criteria. Accordingly, typically, the electronic device provides an interface scheme for moving a screen (i.e., moving a displayed item) through an operation of scrolling the screen.

A scrolling gesture is not limited to a direct contact between the touch screen 120 and the user's body part or the input means enabling a touch, but can include a non-contact. The scrolling gesture can be at least one of a flick gesture (i.e., an action in which the user's finger or the input means enabling a touch is lifted off the touch screen while quickly moving in any one direction in a state of touching one point of the touch screen) and a drag gesture (i.e., an action in which the user's finger or the input means enabling a touch is lifted off the touch screen after moving to another point in a state of touching one point of the touch screen and stopping at another point).

A scroll boundary is a boundary part matched to a progress direction of the gesture, and is a part corresponding to the end of the scroll, in which a screen is not scrolled and an additional object is not displayed when a scrolling gesture is input. Also, the scroll boundary can be at least one of an upper end part, a lower end part, a right end part and a left end part, depending on a direction in which the scrolling gesture progresses. For example, when the scrolling gesture progresses downwards, if the screen is no longer scrolled, a scroll boundary can be an upper end part. In contrast, when the scrolling gesture progresses upwards, if the screen is no longer scrolled, the scroll boundary can be a lower end part. Alternatively, when the scrolling gesture progresses from left to right, if the screen is no longer scrolled, the scroll boundary can be a left end part. In contrast, when the scrolling gesture progresses from right to left, if the screen is no longer scrolled, the scroll boundary can be a right end part.

The first image effect can be a preset light effect in a form such that light spreads in a progress direction of a scrolling gesture from at least one part of a scroll boundary. Also, the second image effect can be a shadow effect which is preset at a contour part of an object matched to the position of a scroll boundary.

In addition, the first image effect can be a light effect such that an area in which light spreads extends and is displayed depending on a time period from the start of the recognition of a scrolling gesture to the end thereof. The second image effect can be a shadow effect such that an area in which a shadow is displayed extends depending on a time period from the start of the recognition of a scrolling gesture to the end thereof. For example, the first image effect can be a light effect such that light starts to spread at a start time point of the recognition of a scrolling gesture and disappears at an end time point thereof. The second image effect can be a shadow effect such that a shadow is displayed at a start time point of the recognition of a scrolling gesture and disappears at an end time point thereof.

Figure 2:
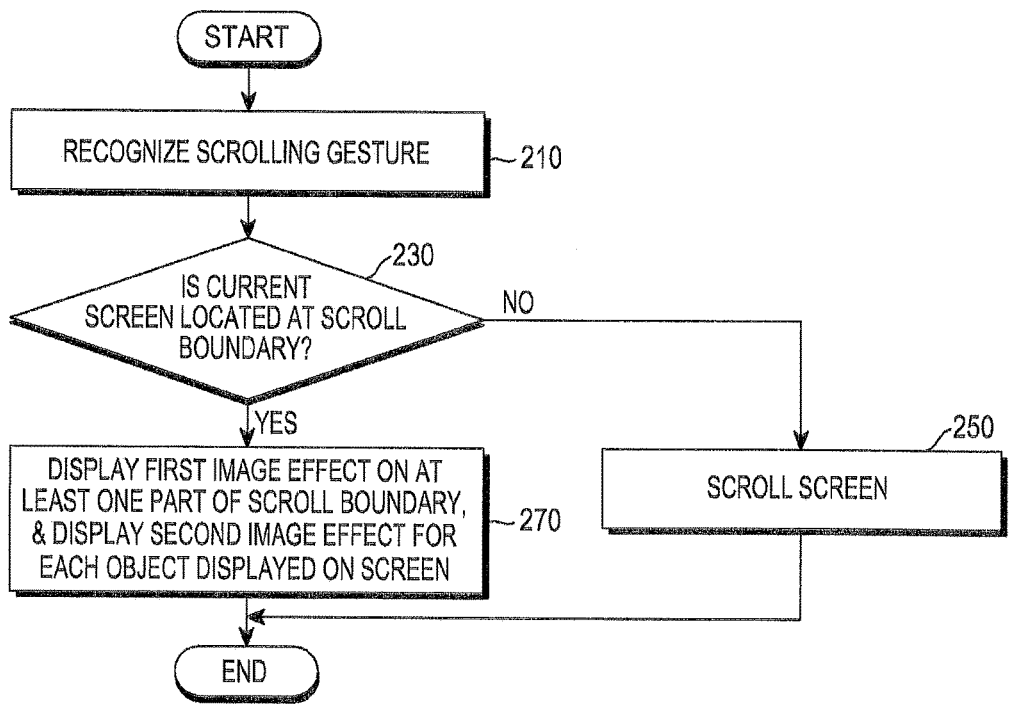
FIG. 2 is a flowchart describing a method for displaying a screen in scrolling the screen, according to a first embodiment of the present disclosure.
Figure 3:
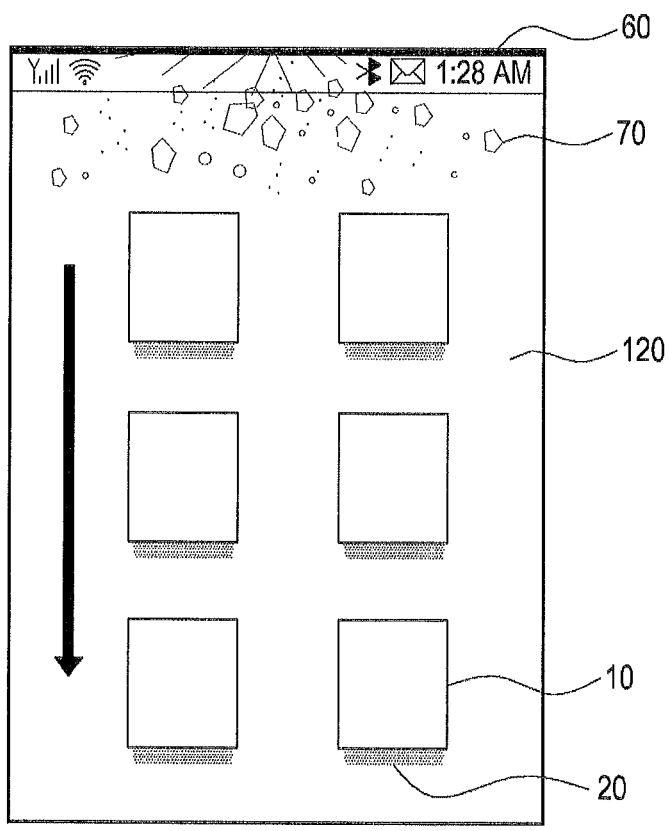
FIG. 3 illustrates an example of displaying a screen in scrolling the screen according to embodiments of the present disclosure.

FIG. 2 is a flowchart describing a method for displaying a screen in scrolling the screen, according to a first embodiment of the present disclosure. Referring to FIG. 2, in step 210, the process recognizes a scrolling gesture that a user has input. Here, the scrolling gesture (or the gesture) can be a flick gesture or a drag gesture which scrolls a screen. In step 230 after step 210, the process determines whether a current screen is located at a scroll boundary. When the process determines that the current screen is located at the scroll boundary in step 230, the process proceeds to step 270. In contrast, when the process determines that the current screen is not located at the scroll boundary in step 230, the process proceeds to step 250. In step 250 after step 230, the process scrolls the screen. In step 270 after step 230, the process displays the first image effect on at least one part of the scroll boundary, and simultaneously, displays the second image effect for each object displayed on the screen. As can be noted from FIG. 3, when a progress direction of the scrolling gesture is an arrow direction (i.e., when the scrolling gesture progresses downwards), an upper end part 60 is a scroll boundary part, a light effect 70 is displayed at the upper end part 60, and a shadow effect 20 is displayed beneath a lower edge of each object 10 for each object 10.

Figure 4:
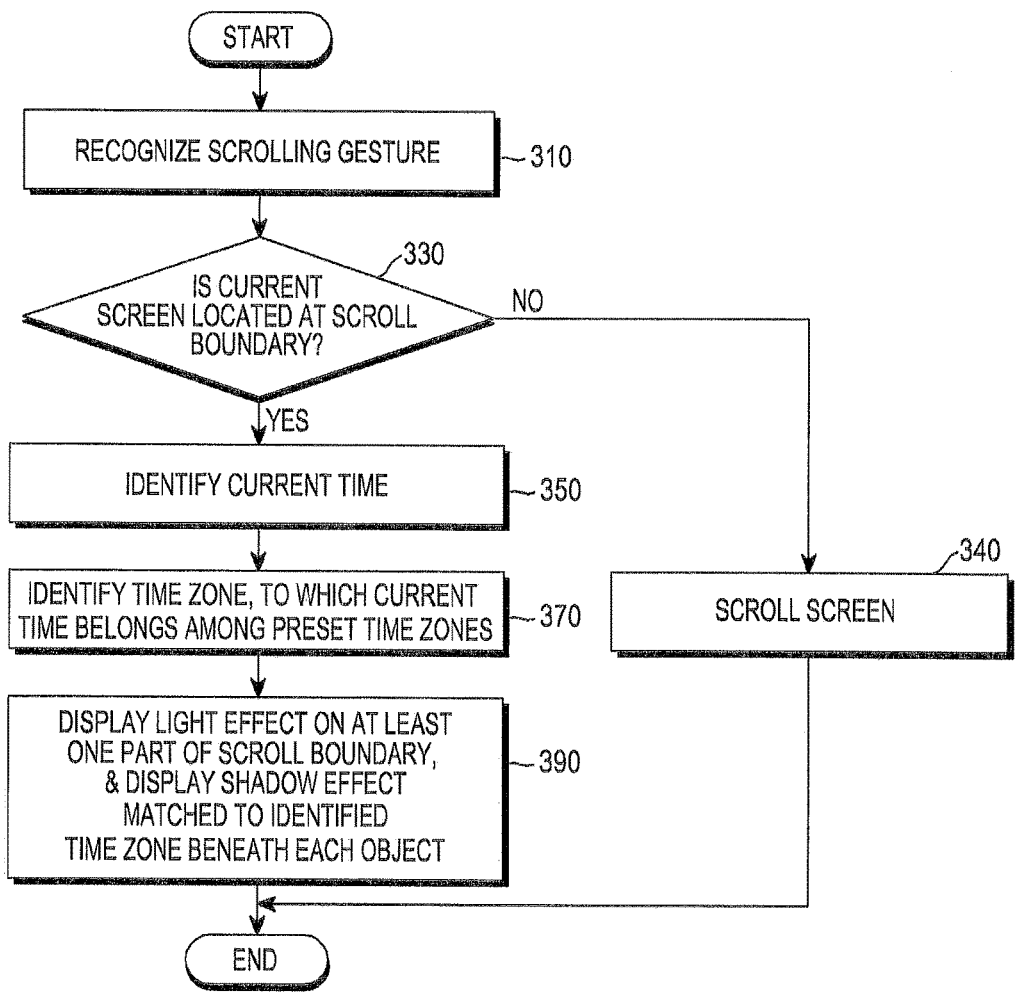
FIG. 4 is a flowchart describing a method for displaying a screen in scrolling the screen, according to a second embodiment of the present disclosure.

FIG. 4 is a flowchart illustrating a method for displaying a screen in scrolling the screen, according to a second embodiment of the present disclosure. Referring to FIG. 4, a shadow effect to be displayed has a length which is set differently for each preset time zone. Accordingly, the process displays a light effect and a shadow effect on at least one part of a scroll boundary and beneath each object, respectively. At this time, the shadow effect displayed beneath each object has the length of a shadow which is expressed differently depending on a preset time period. First, in step 310, the process recognizes a scrolling gesture that a user has input. In step 330 after step 310, the process determines whether a current screen is located at a scroll boundary. When the process determines that the current screen is located at the scroll boundary in step 330, the process proceeds to step 350. In contrast, when the process determines that the current screen is not located at the scroll boundary in step 330, the process proceeds to step 340. In step 340 after step 330, the process scrolls the screen. In step 350 after step 330, the process identifies current time. In step 370 after step 350, the process identifies a time zone, to which the current time belongs among preset time zones. In step 390 after step 370, the process displays a light effect on at least one part of the scroll boundary, and displays a shadow effect matched to the identified time zone beneath each object. Referring to FIG. 5, when a position of light 30 is preset for each time zone and the shadow effect has a length which is set differently depending on the position of light 30, it can be identified that the length of a shadow displayed beneath an object is different for each time zone.

Figures 5A, 5B, 5C:
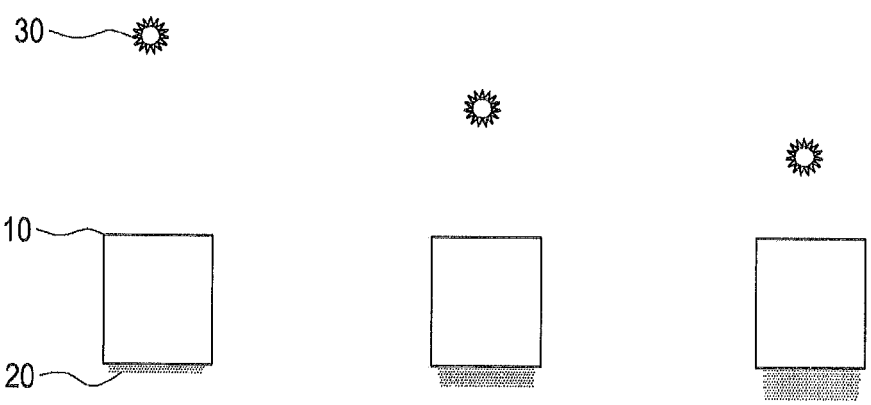
FIGS. 5A to 5C are illustrate examples of applying shadow effects to objects on a screen, depending on the time when the screen is scrolled according to embodiments of the present disclosure.

For example, when the light 30 is preset so as to be located at a position illustrated in FIG. 5A in a time zone of 11 a.m. to 2 p.m. and a shadow 20 is preset so as to have a short length, the effect of the shadow 20 is displayed beneath an object 10 so as to have a preset short length as illustrated in FIG. 5A, in the method for displaying a screen in scrolling the screen according to the second embodiment of the present disclosure. When the light 30 is preset so as to be located at a position illustrated in FIG. 5B in a time zone of 2 p.m. to 5 p.m. and the shadow 20 is preset so as to have a medium length, the effect of the shadow 20 is displayed beneath the object 10 so as to have a preset medium length as illustrated in FIG. 5B, in the method for displaying a screen in scrolling the screen according to the second embodiment of the present disclosure. When the light source 30 is preset so as to be located at a position illustrated in FIG. 5C in a time zone of 5 p.m. to 7 p.m. and the shadow 20 is preset so as to have a long length, the effect of the shadow 20 is displayed beneath the object 10 so as to have a preset long length as illustrated in FIG. 5C, in the method for displaying a screen in scrolling the screen according to the second embodiment of the present disclosure.

Figure 6:
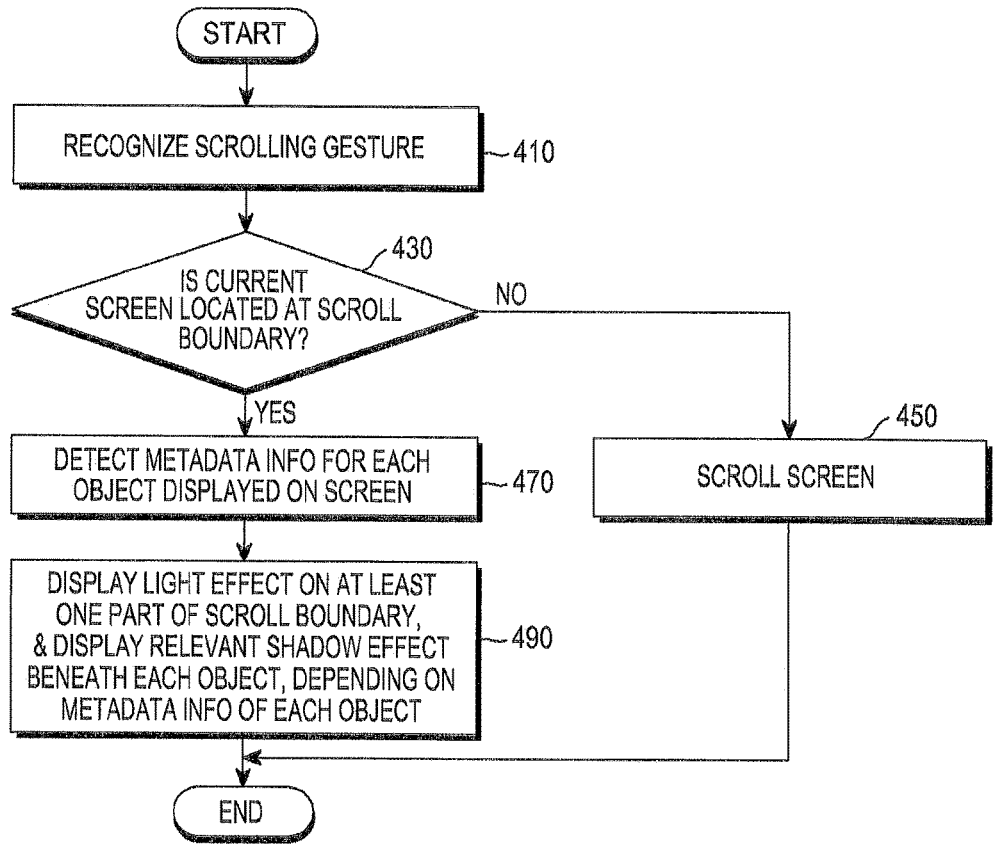
FIG. 6 is a flowchart describing a method for displaying a screen in scrolling the screen, according to a third embodiment of the present disclosure.

FIG. 6 is a flowchart illustrating a method for displaying a screen in scrolling the screen, according to a third embodiment of the present disclosure. Referring to FIG. 6, shadow effects to be displayed are set differently depending on metadata information. According to the third embodiment of the present disclosure, the metadata information can include at least one of the capacity of an object, the quality of the material thereof, the transparency thereof, the thickness thereof, the frequency of use thereof and the generation date thereof, which are stored in the object. Accordingly, the process displays a light effect and a shadow effect on at least one part of a scroll boundary and beneath each object, respectively. At this time, the process displays the shadow effect beneath each object in such a manner as to express at least one of the length of a shadow, the transparency thereof, the color thereof and the form thereof differently depending on metadata information of each object. First, in step 410, the process recognizes a scrolling gesture that a user has input. In step 430 after step 410, the process determines whether a current screen is located at a scroll boundary. When the process determines that the current screen is located at the scroll boundary in step 430, the process proceeds to step 470. In contrast, when the process determines that the current screen is not located at the scroll boundary in step 430, the process proceeds to step 450. In step 450 after step 430, the process scrolls the screen. In step 470 after step 430, the process detects metadata information for each object displayed on the screen. In step 490 after step 470, the process displays a light effect on at least one part of the scroll boundary, and displays a relevant shadow effect beneath each object displayed on the screen, depending on metadata information of each object. For example, referring to FIG. 7, when a shadow effect has a length which is set differently for each preset capacity zone and objects each having capacity information are displayed on the screen, shadow effects having different lengths are displayed beneath the respective objects. Accordingly, the user can identify the degree of a capacity size of each object by using the length of a shadow displayed beneath each object on the screen. Referring to FIG. 7A, when metadata information of an object 10 includes capacity information of 10 mb and a shadow effect is set so as to have a long length, the effect of a shadow 20 is displayed beneath the object 10 so as to have a long length as illustrated in (a) of FIG. 7, in the method for displaying a screen in scrolling the screen according to the third embodiment of the present disclosure. Referring to FIG. 7B, when metadata information of the object 10 includes capacity information of 5 mb and a shadow effect is set so as to have a medium length, the effect of the shadow 20 is displayed beneath the object 10 so as to have a medium length as illustrated in FIG. 7B, in the method for displaying a screen in scrolling the screen according to the third embodiment of the present disclosure. Referring to FIG. 7C, when metadata information of the object 10 includes capacity information of 0 mb and a shadow effect is set so as to have a short length, the effect of the shadow 20 is displayed beneath the object 10 so as to have a short length as illustrated in FIG. 7C, in the method for displaying a screen in scrolling the screen according to the third embodiment of the present disclosure.

For example, referring to FIGS. 8A to 8C, when a shadow effect has at least one of the transparency of a shadow and the color thereof, which is set so as to be different for each of preset attribute information elements (e.g., quality of the material, transparency, thickness, etc.), and when objects each having attribute information are displayed on the screen, the process displays shadow effects, which have different transparencies and/or colors corresponding to each of the attribute information elements, beneath the respective objects. Accordingly, the user can identify the quality of the material of each object, the transparency thereof, the thickness thereof, and the like by using the transparency and/or color of a shadow displayed beneath each object. For example, when a shadow effect is set so as to display transparencies differently depending on the type of material such as fabric, paper, wood and the like, and when the material of an object 10 illustrated FIG. 8A is wood, the effect of a shadow 20 is displayed beneath the object 10 so as to have a low level of transparency as illustrated FIG. 8A, in the method for displaying a screen in scrolling the screen according to the fourth embodiment of the present disclosure. When the material of the object 10 illustrated FIG. 8B is fabric, the effect of the shadow 20 is displayed beneath the object 10 so as to have a medium level of transparency as illustrated FIG. 8B. When the material of the object 10 illustrated FIG. 8C is paper, the effect of the shadow 20 is displayed beneath the object 10 so as to have a high level of transparency as illustrated FIG. 8C.

For example, referring to FIGS. 9A to 9B, when a shadow effect has a shadow form which is preset depending on the frequency of use of an object, the generation date thereof and the like, and when objects are displayed on the screen, shadow effects having different forms are displayed beneath the respective objects. Accordingly, the user can identify the frequency of the use of each object, the generation date thereof and the like by using a shadow form displayed beneath each object. For example, when the shadow effect has a shadow form which is preset differently depending on the generation date of an object, and when metadata information includes a generation date (i.e., May of 2013) when an object 10 illustrated in FIG. 9A has been generated, the effect of a shadow 20 is displayed beneath the object 10 so as to have a form illustrated in FIG. 9A, in the method for displaying a screen in scrolling the screen according to the third embodiment of the present disclosure. When metadata information includes a generation date (i.e., April of 2013) when the object 10 illustrated in FIG. 9B has been generated, the effect of the shadow 20 is displayed beneath the object 10 so as to have a form illustrated in FIG. 9B.

Figure 10:
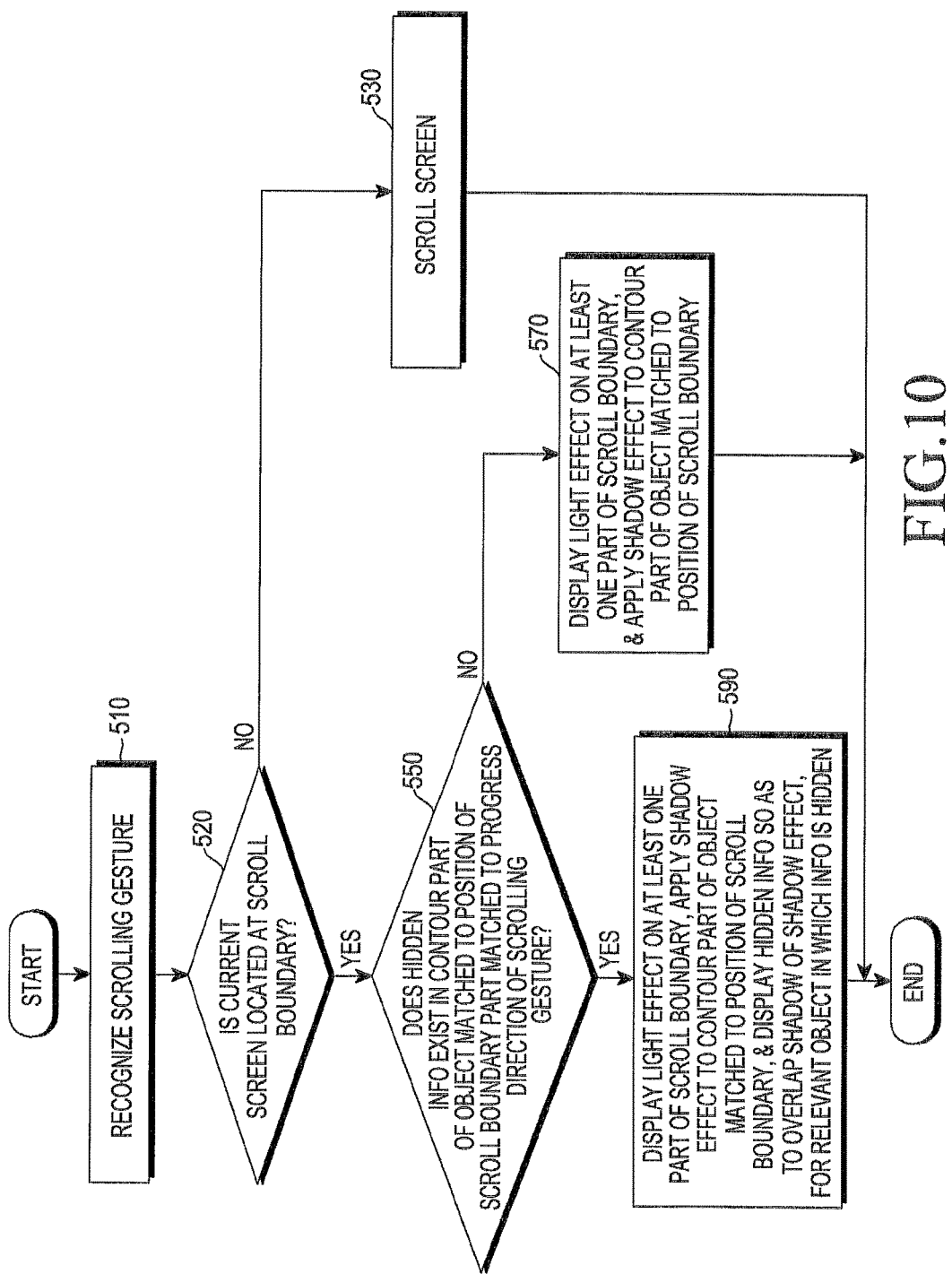
FIG. 10 is a flowchart describing a method for displaying a screen in scrolling the screen, according to a fourth embodiment of the present disclosure.
Figure 11A:
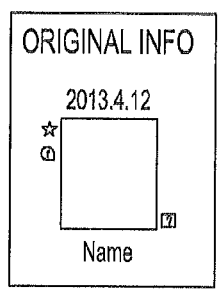
FIGS. 11A to 11F illustrates examples of applying shadow effects to objects on a screen, depending on information hidden in the objects on the screen when the screen is scrolled according to embodiments of the present disclosure.
Figure 11B:
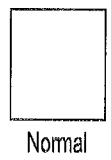
Figure 11C:
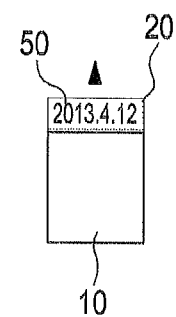
Figure 11D:
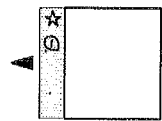
Figure 11E:
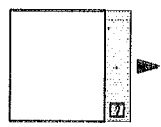
Figure 11F:

FIG. 10 is a flowchart illustrating a method for displaying a screen in scrolling the screen, according to a fourth embodiment of the present disclosure. Referring to FIG. 10, the process displays a light effect and a shadow effect on at least one part of a scroll boundary and beneath each object, respectively. At this time, when hidden information exists at a contour part of an object which is matched to the position of the scroll boundary, the process displays the hidden information so as to overlap a shadow of the shadow effect. First, in step 510, the process recognizes a scrolling gesture that a user has input. In step 520 after step 510, the process determines whether a current screen is located at a scroll boundary. When the process determines that the current screen is located at the scroll boundary in step 520, the process proceeds to step 550. In contrast, when the process determines that the current screen is not located at the scroll boundary in step 520, the process proceeds to step 530. In step 530 after step 520, the process scrolls the screen. In step 550 after step 520, the process determines whether hidden information exists at a contour part of an object which is matched to the position of the scroll boundary. When the process determines in step 550 that the hidden information exists in the contour part of the object which is matched to the position of the scroll boundary, the process proceeds to step 590. In contrast, when the hidden information does not exist in the contour part of the object which is matched to the position of the scroll boundary, the process proceeds to step 570. In step 570 after step 550, the process displays a light effect on at least one part of the scroll boundary, and applies a shadow effect to the contour part of the object which is matched to the position of the scroll boundary. In step 590 after step 550, the process displays a light effect on at least one part of the scroll boundary, applies a shadow effect to the contour part of the object which is matched to the position of the scroll boundary, and displays hidden information so as to overlap a shadow of the shadow effect, for a relevant object in which the information is hidden. For example, referring to FIGS. 11A to 11F, when hidden information exists in a contour part of an object as illustrated in FIG. 11A, the process identifies an area where a shadow effect is to be displayed in the contour part of the object. When the process determines that the hidden information exists in the identified area where the shadow effect is to be displayed, the process displays the hidden information so as to overlap a shadow of the shadow effect. FIG. 11B illustrates an object for which the light effect and the shadow effect are not displayed when the screen is scrolled in step 530. Referring to FIG. 11C, when a scrolling gesture progresses upwards on the screen and the current screen displays a scroll boundary part, the process displays information, which is hidden in an upper contour part of the object 10, so as to overlap a shadow of the shadow effect as illustrated in FIG. 11C. Referring to FIG. 11D, when the scrolling gesture progresses from right to left on the screen and the current screen displays a scroll boundary part, the process displays information, which is hidden in a left contour part of the object 10, so as to overlap a shadow of the shadow effect as illustrated in FIG. 11D. Referring to FIG. 11E, when the scrolling gesture progresses from left to right on the screen and the process determines that the current screen is located at a scroll boundary, the process displays information, which is hidden in a right contour part of the object 10, so as to overlap a shadow of the shadow effect as illustrated in FIG. 11E. Referring to FIG. 11F, when the scrolling gesture progresses downwards on the screen and the process determines that the current screen is located at a scroll boundary, the process displays information, which is hidden in a lower contour part of the object 10, so as to overlap a shadow of the shadow effect as illustrated in FIG. 11F.

The hidden information and the shadow effect which are displayed on the screen can disappear from the screen when a preset time period passes. Also, the hidden information and the shadow effect which are displayed on the screen can be displayed during a time period from the start of the recognition of the scrolling gesture to the end thereof.

In FIG. 11, the hidden information exists in each of the upper contour part, the lower contour part, the left contour part and the right contour part of the object. However, the hidden information can exist in at least one of the four contour parts.

As described above, the configuration and the operation of the method, the apparatus and the recording medium for displaying a screen in scrolling the screen, according to an embodiment of the present disclosure, can be implemented. Meanwhile, although the present disclosure has been shown and described with reference to certain embodiments thereof, various other embodiments of the present disclosure may be implemented, and various changes and modifications may be made to the embodiments of the present disclosure. All or some of the operations described in the present specification may be simultaneously performed in parallel, some of the operations may be omitted, or other additional operations may be included.

Figure 12:
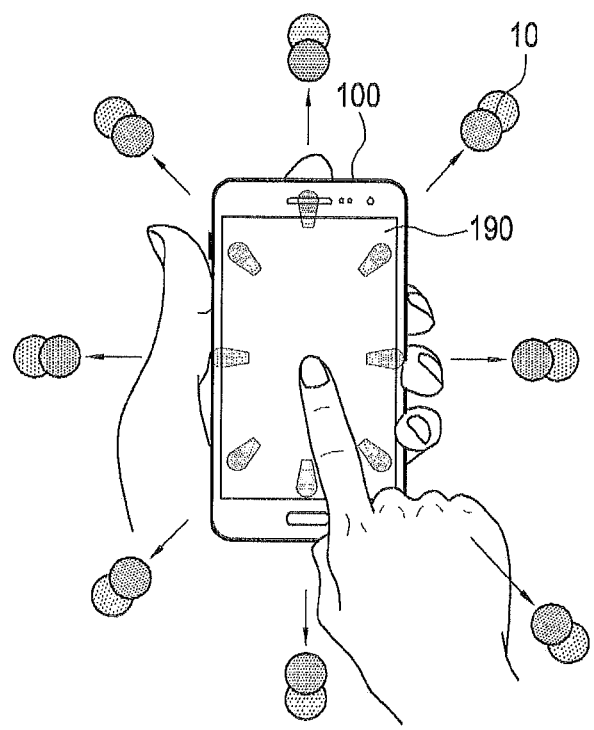
FIG. 12 is a view illustrating an example of a direction of displaying a shadow effect in each direction of a scrolling gesture according to embodiments of the present disclosure.

In the embodiments of the present disclosure, in addition to the directions of the scrolling gesture described as examples, various directions of the scrolling gesture can be applied to the scrolling of the screen 190 of the electronic device 100 as illustrated in FIG. 12. Also, the effect of the shadow 10 can be displayed so as to have a length increasing in a direction identical to a progress direction of the scrolling gesture. Further, when light is emitted in a direction identical to a progress direction of the scrolling gesture, the effect of the shadow 10 can be applied to the position of a relevant object, which is identical to that of a shadow that light actually generates.

According to an additional embodiment of the present disclosure, when it is determined that a current screen is located at a scroll boundary during the recognition of a scrolling gesture, a light effect can be displayed on at least one part of the scroll boundary, and a shadow effect can be displayed in an end part at the opposite side of the scroll boundary on the screen.

Figure 13A:
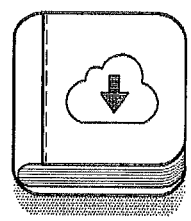
FIGS. 13A to 13D illustrate examples of applying shadow effects to objects in a case where a screen is scrolled according to embodiments of the present disclosure.
Figure 13B:
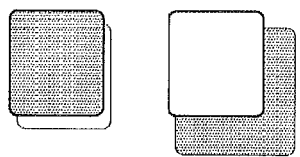
Figure 13C:
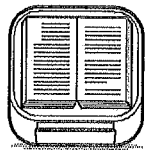
Figure 13D:
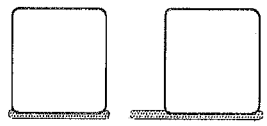

In addition to the shadow effects displayed for the respective objects according to the embodiments of the present disclosure, shadow effects can be displayed at positions of contour parts of objects in forms illustrated in FIG. 13A and FIG. 13B, depending on a progress direction of a scrolling gesture. Alternatively, shadow effects can have forms illustrated in FIG. 13C and FIG. 13D.

Figure 14A:
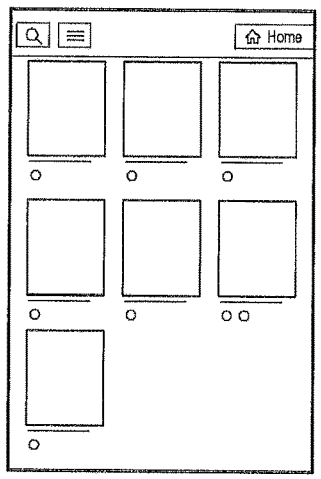
FIGS. 14A to 14F illustrate examples of displaying screens in scrolling screens according to another embodiment of the present disclosure.
Figure 14B:
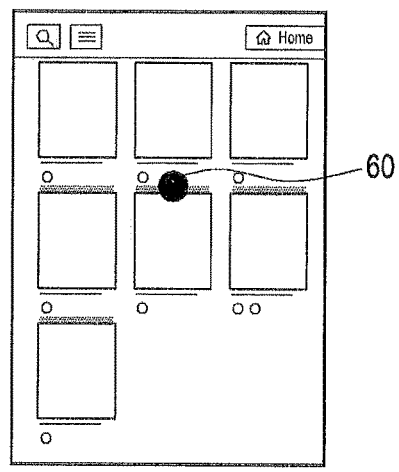
Figure 14C:
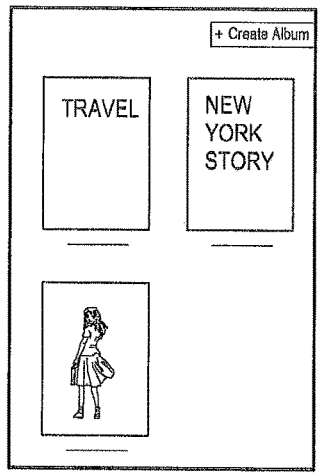
Figure 14D:
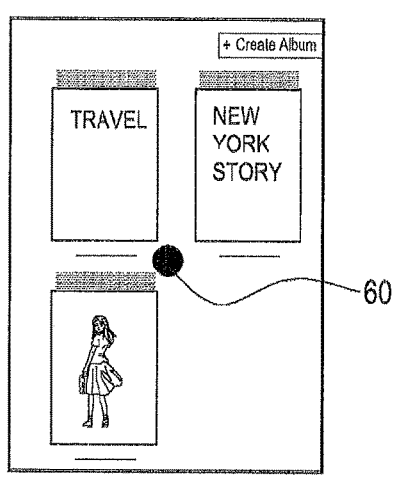
Figure 14E:
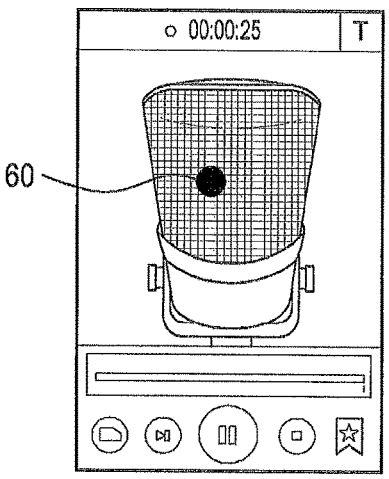
Figure 14F:
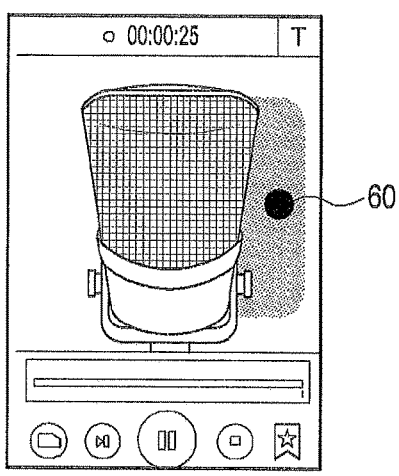

According to another additional embodiment of the present disclosure, when it is determined that a current screen is located at a scroll boundary during the recognition of a scrolling gesture, only a shadow effect can be displayed for each object. Referring to FIGS. 14A to 14F, when it is determined that a current screen is located at a scroll boundary while a scrolling gesture 60 is input upwards on a screen illustrated in each of FIG. 14A and FIG. 14C, only a shadow effect can be displayed for each object, as illustrated in FIG. 14B and FIG. 14C. When it is determined that a current screen is located at a scroll boundary while the scrolling gesture 60 is input from left to right on a screen illustrated in FIG. 14E or FIG. 14F, only a shadow effect can be displayed at a right contour part of an object.

Figure 15:
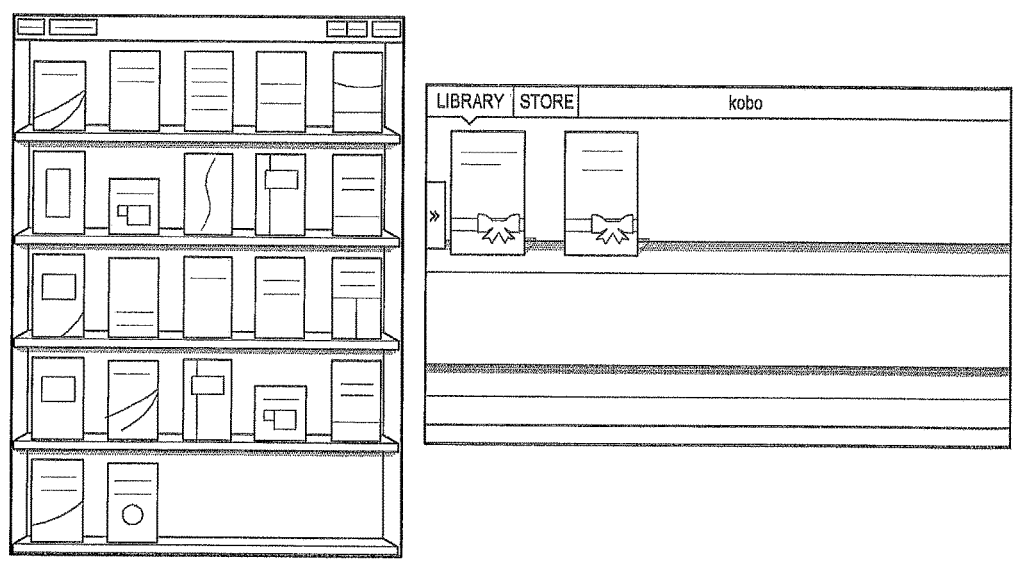
FIG. 15 illustrates an example of a scrolled screen according to embodiments of the present disclosure.

Embodiments of the present disclosure can be applied to an electronic book application screen including multiple electronic books as illustrated in FIG. 15. Also, the embodiments of the present disclosure can be applied to various screens, such as a contact screen, a file list screen, a text conversation service screen, a mail list search screen, an SMS message reception/transmission item search screen, an address book search screen, and the like.

For example, according to the above-described embodiments of the present disclosure, an area is identified where a shadow effect is to be displayed in a contour part of each object. When it is determined that hidden information exists in the identified area where the shadow effect is to be displayed, the hidden information is displayed so as to overlap a shadow of the shadow effect, as described above. However, when it is determined that hidden information merely exists in each object, the hidden information can be displayed so as to overlap a shadow of the shadow effect.

Further, according to the above-described embodiments of the present disclosure, shadow effects are discriminated from each other by using each time zone and each of metadata information elements which include at least one attribute information among the capacity of an object, the quality of the material thereof, the transparency thereof and the thickness thereof, and at least one information of the frequency of use of the object and the generation date thereof, and thereby have their respective preset lengths, transparencies, colors, forms and the like, as described above. However, at least one of a length, a transparency, a color and a form can be preset according to a combination of the time zone and the metadata information elements.

As described above, the method, the apparatus and the recording medium for displaying a screen, according to embodiments of the present disclosure, can provide the user with the scrolled screen, which intuitively notifies the user that the current screen has been scrolled to a scroll boundary and simultaneously, expresses a luxurious design by reflecting light and shadow effects in the screen in real time in terms of an emotional approach, when the current screen displays a scroll boundary part matched to a progress direction of a scrolling gesture in scrolling the screen.

It will be appreciated that the exemplary embodiments of the present disclosure can be implemented in a form of hardware, software, or a combination of hardware and software. Regardless of being erasable or re-recordable, such an optional software can be stored in a non-volatile storage device such as a ROM, a memory such as an RAM, a memory chip, a memory device, or an integrated circuit, or a storage medium such as a CD, a DVD, a magnetic disc, or a magnetic tape that is optically or electromagnetically recordable and readable by a machine, for example, a computer. It will be appreciated that a memory, which may be incorporated in a portable terminal, may be an example of a machine-readable storage medium which is suitable for storing a program or programs including commands to implement the exemplary embodiments of the present disclosure. Therefore, embodiments of the present disclosure provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present disclosure properly includes the things equivalent to that.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling an electronic device including a display, the method comprising:
   identifying whether a screen being displayed on the display is located at a scroll boundary in response to receiving a scrolling gesture, wherein the screen comprises an object having hidden information associated with the object and the hidden information is not displayed on the screen; and
   in response to identifying that the screen is located at the scroll boundary:
      adding a shadow effect to a first part of a contour of the object contained on the screen, wherein the first part of the contour of the object corresponds to a progress direction of the scrolling gesture;
      displaying the hidden information to cover part of the shadow effect; and
      adding a first boundary effect to at least a part of the scroll boundary.

2. The method as claimed in claim 1, further comprising: identifying a current time zone among preset time zones, wherein the shadow effect has a different length for each preset time zone.

3. The method as claimed in claim 1, further comprising: detecting metadata information of the object displayed on the screen, wherein the shadow effect added to the first part of the contour of the object is further determined based on the metadata information.

4. The method as claimed in claim 3, wherein the metadata information includes a capacity of the object, and the shadow effect added to the first part of the contour of the object has a different length for each size of the capacity of the object according to the metadata information.

5. The method as claimed in claim 3, wherein the metadata information comprises at least one attribute information of a quality of material of the object, a transparency of the object, and a thickness of the object, and the shadow effect added to the first part of the contour of the object has at least one attribute of a transparency and a color, the at least one attribute being set differently according to the metadata information.

6. The method as claimed in claim 3, wherein the metadata information comprises at least one information of a frequency of use of the object, and a generation date of the object, and the shadow effect added to the first part of the contour of the object is set differently depending on each of the at least one information according to the metadata information.

7. The method as claimed in claim 1, wherein the displaying of the hidden information comprises displaying, for a first object having the first part of the contour in which the hidden information exists, the hidden information to cover part of the shadow effect associated with the first object with a remaining part of the shadow effect associated with the first object.

8. The method as claimed in claim 1, wherein the object comprises at least one of an icon, a widget, a text, a picture, a photograph and an electronic book.

9. An electronic device, comprising:
   a touch screen; and
   a controller configured to:
      identify whether a screen being displayed on the touch screen is located at a scroll boundary in response to detecting a scrolling gesture through the touch screen, wherein the screen comprises an object having hidden information associated with the object and the hidden information is not displayed on the screen; and in response to identifying that the screen is located at the scroll boundary:

add a shadow effect to a first part of a contour of the object contained on the screen, wherein the first part of the contour of the object corresponds to a progress direction of the scrolling gesture;

display the hidden information to cover part of the shadow effect; and add a first boundary effect to at least a part of the scroll boundary.

10. The electronic device as claimed in claim 9, wherein the shadow effect has a length which is set differently for each preset time zone, and the controller is configured to identify a current time zone from among preset time zones.

11. The electronic device as claimed in claim 9, wherein the shadow effect has at least one attribute of a length, a transparency, a color and a form, the attribute being set differently depending on metadata information.

12. The electronic device as claimed in claim 11, wherein the metadata information comprises at least one information of a capacity, a quality of material, a thickness, a frequency of use, and a generation date of the object.

13. The electronic device as claimed in claim 9, wherein the controller is configured to:

in displaying the hidden information, display, for a first object having a part of a contour corresponding to the progress direction of the scrolling gesture in which the hidden information exists, the hidden information to cover part of the shadow effect associated with the first object with a remaining part of the shadow effect associated with the first object.

14. A non-transitory recording medium storing a program for controlling an electronic device including a display, the program when executed by a processor causing the processor to perform operations comprising:

identifying whether a screen being displayed on the display is located at a scroll boundary in response to receiving a scrolling gesture, wherein the screen comprises an object having hidden information associated with the object and the hidden information is not displayed on the screen; and in response to identifying that the screen is located at the scroll boundary:

adding a shadow effect to a first part of a contour of the object contained on the screen, wherein the first part of the contour of the object corresponds to a progress direction of the scrolling gesture;

displaying the hidden information to cover part of the shadow effect; and adding a first boundary effect to at least a part of the scroll boundary.

* * * * *